United States Patent
Feeley et al.

(10) Patent No.: US 6,557,243 B2
(45) Date of Patent: May 6, 2003

(54) METHOD TO REPAIR A PERMANENTLY SEALED AIR DATA TUBE

(76) Inventors: Christopher M. Feeley, 1154 N. Gum St., Broken Arrow, OK (US) 74012; Andrew J. Feeley, 312 N. Fir Ave., Broken Arrow, OK (US) 74012

( * ) Notice: Subject to any disclaimer, the term of this patent is extended or adjusted under 35 U.S.C. 154(b) by 174 days.

(21) Appl. No.: 09/844,423

(22) Filed: Apr. 27, 2001

(65) Prior Publication Data

US 2002/0157229 A1 Oct. 31, 2002

(51) Int. Cl.$^7$ ................................................ H05B 3/00
(52) U.S. Cl. .................... 29/611; 29/592.1; 29/825; 29/593; 73/866.5
(58) Field of Search ............................. 29/611, 592.1, 29/825, 593; 73/866.5, 170, 182, 861

(56) References Cited

U.S. PATENT DOCUMENTS

| | | | | |
|---|---|---|---|---|
| 5,337,602 A | * | 8/1994 | Gibson | 73/182 |
| 5,442,958 A | * | 8/1995 | Hagen | 73/170.02 |
| 5,477,009 A | * | 12/1995 | Brendecke et al. | 174/52.3 |
| 5,811,691 A | * | 9/1998 | Jackson | 73/861.65 |
| 6,070,475 A | * | 6/2000 | Muehlhauser et al. | 73/861.68 |
| 6,370,450 B1 | * | 4/2002 | Kromer et al. | 701/14 |
| 6,452,542 B1 | * | 9/2002 | Bachinski et al. | 342/357.06 |
| 6,465,767 B2 | * | 10/2002 | Jones | 250/207 |
| 6,487,912 B1 | * | 12/2002 | Behm et al. | 73/753 |

* cited by examiner

Primary Examiner—Joseph J. Hail, III
Assistant Examiner—Alvin J. Grant
(74) Attorney, Agent, or Firm—Head, Johnson and Kachigian

(57) ABSTRACT

A method to repair a permanently sealed air data tube by identifying at least one area of a strut component of said air data tube wherein said strut component may be broached to provide access to internal components accommodated generally within the interior portion of said tube; broaching said strut component and a probe component in areas generally consistent with those portions identified as providing manipulative access to internally accommodated components; removing said internally accommodated components; refurbishing the internal surface areas of the vacated air data tube; inspecting exterior surfaces and said internally accommodated components; determining air data tube components requiring replacement wherein said determination is made by choosing from a group of some or all of the used air data tube components including, but not limited to, a strut component, one or more heating element component(s), a probe component, one or more static line component(s), one or more static line fitting component(s), one or more hermetic seal(s), one or more pitot pressure line fitting connector(s) and a pitot pressure line, an electrical connector; re-assembling said air data tube with said determined replacement components; re-sealing broached air data tube components; and restoring the external surface of said re-sealed air data tube to an airworthy condition.

24 Claims, 4 Drawing Sheets

METHOD TO REPAIR A PERMANENTLY SEALED AIR DATA TUBE

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention generally relates to air data sensing tubes such as, but not limited to, pitot tubes. In particular the present invention relates to a system and method to repair a permanently sealed air data sensing tube.

BACKGROUND OF THE INVENTION

The instant invention advances the art and teaches a process whereby internally accommodated components of a permanently sealed air data tube can be replaced and thus extend the useful life of the tube.

As used herein, the terms "pitot tube", "pitot static tube", "sealed pitot tube", "air data sensing probe", "air data tube", "air data sensing tube", "air data probe", "pitot probe", "pitot static probe", "electrically heated pitot tube", "aerodynamically compensated static pressure tube", "electrically heated pitot static probe", "heated pitot tube", "heated pitot static tube", "heated probe", "pressure sensing instrument for aircraft", "strut mounted oval static tube", "multi-functional air data sensing probe" and "aerodynamic air data sensing probe" are used synonymously and interchangeably. The term "strut" relates to an air data tube component which distances a probe component of the air data tube several inches away from a fuselage or other aircraft surface to which the air data tube is attached. The term "probe" when used individually relates interchangeably and synonymously to that component of an air data tube which contains a pitot pressure opening. The probe typically, though not necessarily, embodies one or more moisture drain and/or static port holes as well.

Air data tubes are used on aircraft for measuring certain parameters such as air speed, altitude, static pressure and other air measurement information and are typically mounted to the body or nose portion of an aircraft. Air data tubes usually contain an electrical heating element to melt off and prevent ice accumulations which can plug the air channel openings of air data tubes during flight.

Generally, air data tubes have a base section from which the tube's strut component extends at an angle and terminates after connecting to the tube's probe component. Many air data tubes are considered sealed single units, whereby the internal components, heating elements and probe are permanently sealed via conventional methods such as, but not limited to, welding, brazing or soldering. Oftentimes, these joints are hidden as the tube in its totality is plated or otherwise smoothed to allow for better aerodynamics. Consequently, the tube appears absent of any discernable means to access its internal components. In the event that a pitot pressure opening located at the end of the probe tip becomes damaged or eroded due to corrosion, pitot static ports along the probe section become damaged or eroded due to corrosion, a tube's heating element(s) malfunctions, its pitot pressure line leaks or another tube connected component becomes damaged, the entire air data tube is discarded and replaced with an entirely new unit. Such lack of repairability results in increased costs as the entire unit is replaced, irrespective of whether the cause was due to a major or minor problem. Specifically, prior to the teaching of the instant invention, the art lacked teaching, disclosure and claim of a method of disassembly, component replacement/repair and reassembly of permanently sealed air data tubes. Most air data tubes currently used on commercial aircraft built by Boeing, McDonald Douglas and Airbus utilize such permanently sealed tube unit types.

As a large variety of aircraft models exist, and as specific air data tubes are designed for specific placement on specific aircraft models, the sizes, shapes internal components of air data tubes may vary considerably. However, it should be noted that most air data tubes operate in functionally the same manner. Different manufacturers promote different designs, and many known designs exist. There are many prior art patents for the design and manufacture of air data tubes. The present invention relates to the repair and overhaul of air data tubes that have been designed as unitary or sealed units. The teaching of the instant invention is the art of determining a suitable section or sections of the air data tube to allow for exposure and removal of its internal components, removal of the tube's permanently attached heating element, removal of internal pitot and static tube components, and the replacement of unsuitable components with newly manufactured or refurbished parts, thereby restoring the overall unit to an airworthy status.

The present invention improves upon the art and fills a major void in the marketplace by enabling an aircraft owner to overhaul an air data tube with newly manufactured major components at a substantially reduced amount of cost. Savings to multiple aircraft owners such as a commercial airlines, or air cargo carriers can result in millions of dollars of cost savings each year. Most large aircraft have between 2 and 8 air data tubes mounted on them. The tubes have an average life span of between 3 and 7 years. From an aircraft owners point of view, use of this invention will transform the air data tube from what was once considered an "expendable" item to a "repairable" item.

While numerous problems can cause a probe to malfunction and be taken out of service, a few common problems represent the majority of the fatal issues. They are:

1. The probe section and its various openings become worn from corrosion and wind damage. If the openings are worn beyond specifications allowed for by the OEM, the entire unit must be discarded and replaced with a new unit.
2. Malfunction of the heating element(s). Inability of the heating element to properly heat the probe section and strut of the air data tube can cause ice build up, closing the openings to the air data ports. Since the heating element is permanently attached to the inside wall of the probe section and strut, and since heretofore, the art was absent means by which to gain access to the internal portion of the tube without destroying it, the entire air data tube was discarded and replaced with a new unit.

The present invention provides for a method of elongating the useful life of these type of air data tubes by teaching a method for opening the air data tube body (strut), and removing components requiring repair or replacement. Having followed and completed the teachings of the instant invention, the air data tube may be returned to service, providing a substantial cost savings to an aircraft owner.

BRIEF SUMMARY OF THE INVENTION

It is an object of the instant invention to provide a process by which permanently sealed air data tubes may be repaired and returned to useful service.

It is another object of the instant invention to teach a method by which a broachable area of an air data tube may be identified to allow access to its internally accommodated components for purposes of repair.

It is a further object of the instant invention to teach a singularly applicable process by which any model of a permanently sealed air data tube may be repaired and returned to useful service.

An additional object of the instant invention is to reduce costs associated with the replacement of non-repairable air data tubes.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1A:
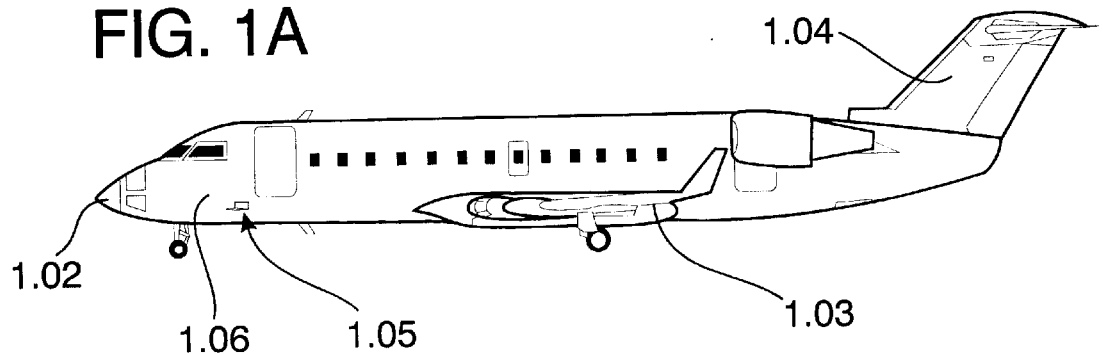
FIG. 1A is an illustration of an aircraft with an air data tube affixed.
Figure 1B:
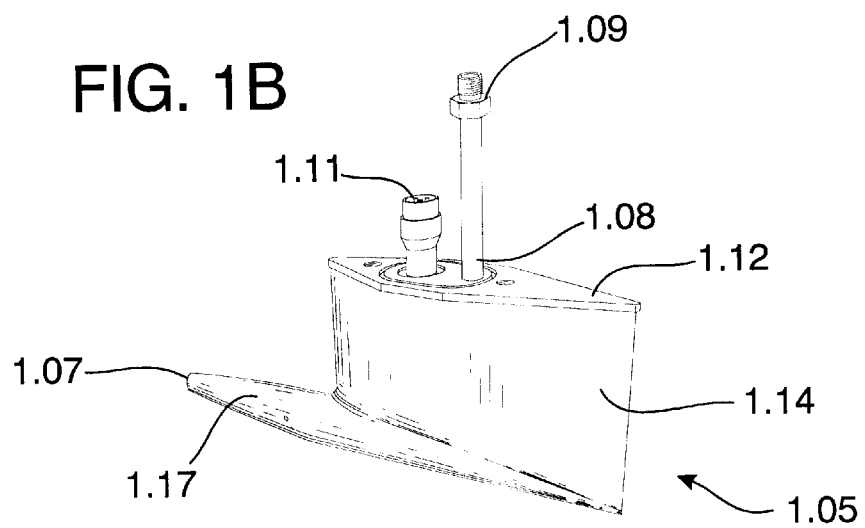
FIGS. 1B through 1C illustrate non-limiting permanently sealed air data tubes of varying design used in association with aircraft speed monitoring as practiced in the invention's preferred embodiment.
Figure 1C:
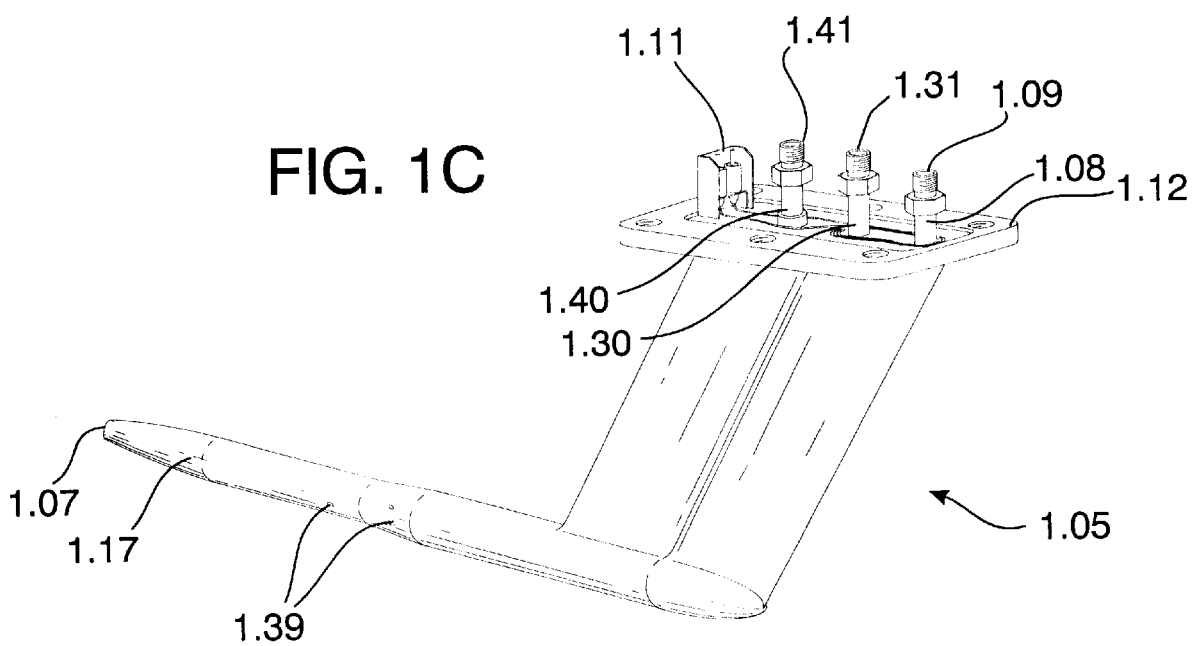

The methodology of the present invention is best understood having once overviewed air data tube placement in association with large aircraft and various non-limiting types of air data tubes to which the invention addresses itself. As previously discussed, non-repairable, permanently sealed air data tubes are commonly employed on aircraft such as, but not limited to, Boeing, McDonald Douglas and Airbus. FIGS. 1A through 1C address themselves to this explanation. As can be seen in FIG. 1A, an air data tube 1.05 is affixed to the lower part or nose of an aircraft fuselage 1.06. Depending upon aircraft type and model, an air data tube's placement will vary from the afore noted placement to placement along lower wing surfaces 1.03 (not shown) as well as tail 1.04 and nose 1.02 sections of the aircraft. FIG. 1B illustrates an external view of an air data tube typically used in association with MD-80, MD-90 or DC-9 aircraft wherein 1.14 represents the tube's strut component, 1.08 the tube's pitot pressure line component, 1.11 the tube's heating element electrical connector component and 1.17 the tube's probe component. In FIG. 1B a pitot pressure opening 1.07 in the probe component 1.17 allows incoming air to be introduced into the air data tube's pitot pressure line component 1.08 whereupon it is attached to a pitot pressure fitting 1.09. Various means to attach air data tubes 1.05 to aircraft are utilized with said means well known and practiced by those skilled in the art. In FIGS. 1B, a base 1.12 is utilized to facilitate such aircraft connection purposes. Based upon aircraft and air data tube requirements, the base 1.12 may contain a plurality of components to facilitate the various aircraft connection requirements. Such components without limitation would include, but not be limited to, electrical connectors, pressure fittings, static line pressure fittings, bolts and bolt holes. FIG. 1C further illustrates examples of these additional components. Turning now to FIG. 1C.

FIG. 1C illustrates yet another version of the air data tube typically used in association with Boeing 737 aircraft and further illustrates multiple static port holes 1.39 connecting to static port lines 1.40 and 1.30. Static port pressure fittings 1.31 and 1.41 are used to facilitate connection to an aircraft. Also shown in FIG. 1C is the air data tube's heating element connecting component(s) 1.11, a pitot pressure line 1.08 and a pitot line pressure fitting 1.09.

Figure 2:
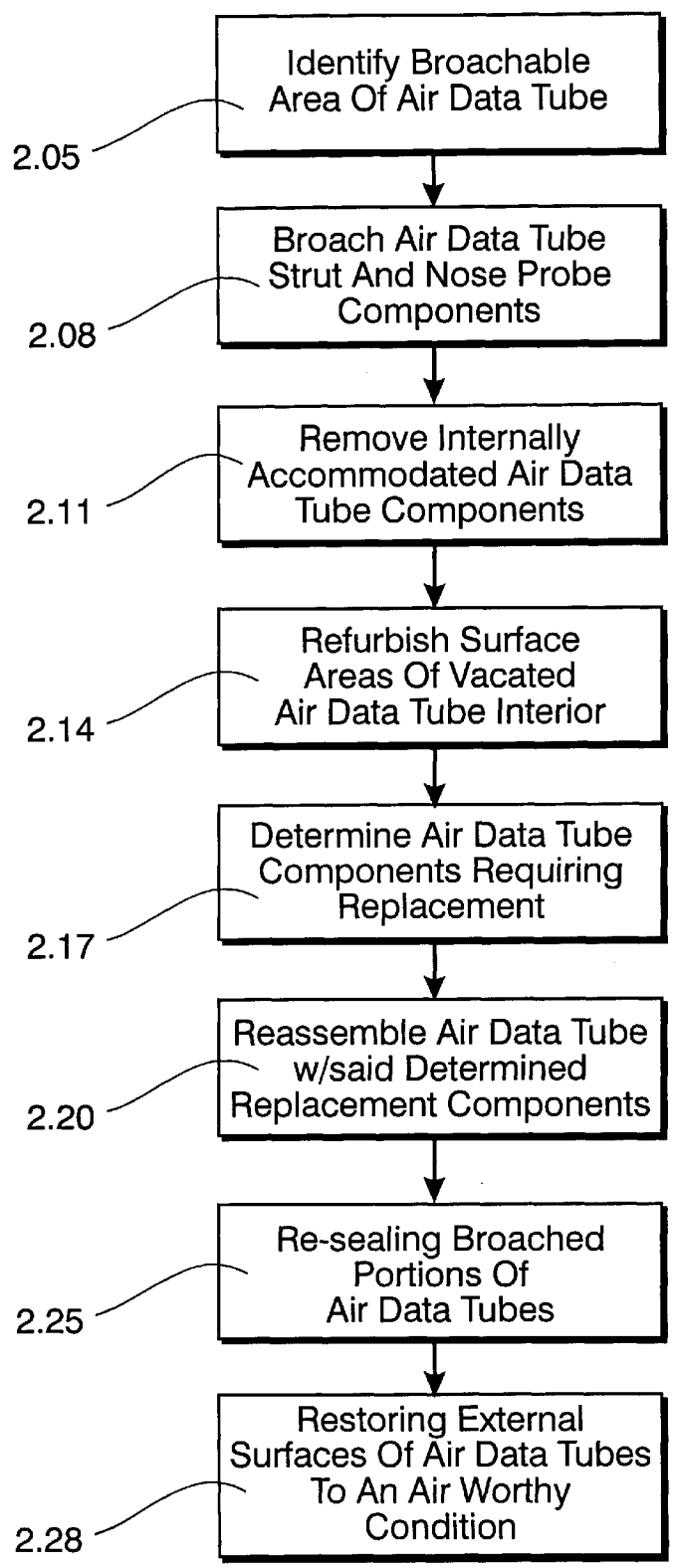
FIG. 2 is a process flow diagram illustrating steps necessary to effectuate the repair of a permanently sealed air data tube according to the invention as practiced in its preferred embodiment.

FIG. 2 illustrates and details the process steps necessary to effectuate the repair of an air data tube once disengaged from an aircraft. Said steps as provided in FIG. 2 illustrate a preferred though non-limiting process sequence when practicing the invention in its preferred embodiment. Turning now to FIG. 2.

As can be seen in FIG. 2 it is first necessary to identify a broachable area of an air data tube whereby the air data tube may be opened to provide access to the internal components accommodated generally within the interior portion of the tube 2.05. This identification is facilitated by any means which would visually represent the location and positioning of the tube's internal component structures. In the invention's preferred embodiment, a common X-ray means provides for such visual perception though it can be easily envisioned where alternative means, such as computerized axial tomography, outer surface removal (abrasive) or tube destruction may be utilized to effectuate this purpose. Once determined for a specific air data tube model, the practice of the invention's identification step may be optionally bypassed.

Figure 3A:
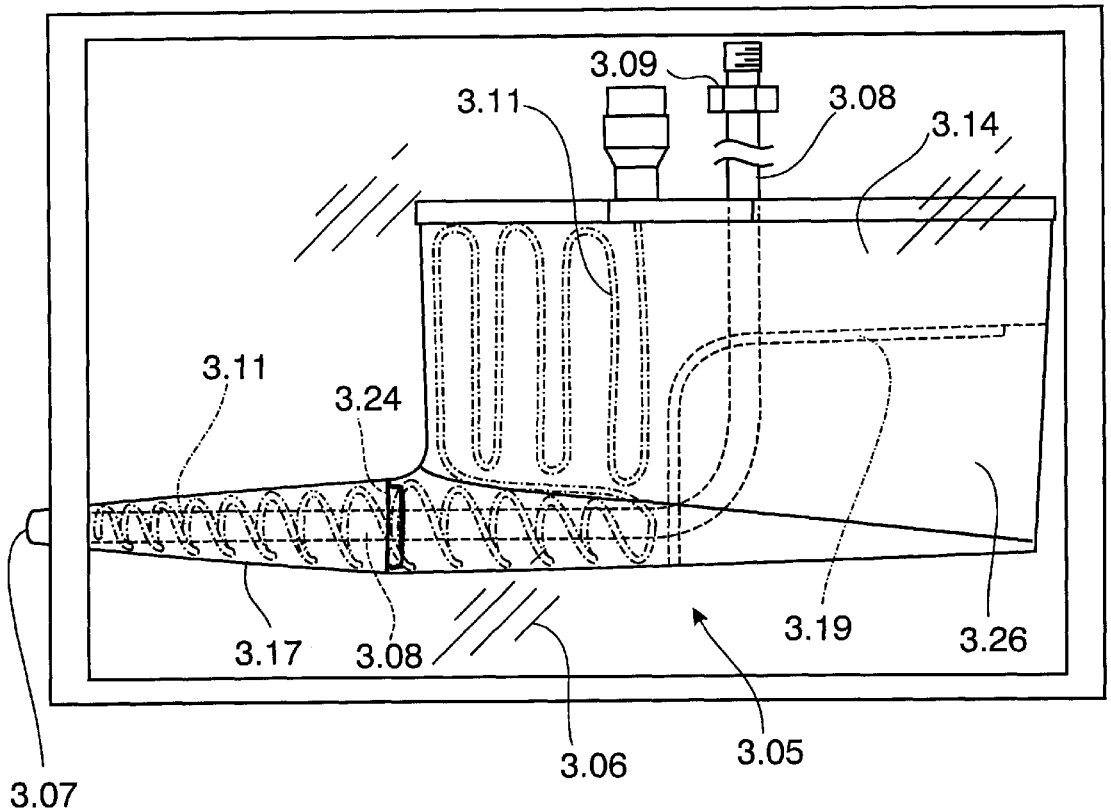
FIG. 3A, for purposes of enabling disclosure, is an illustration of a generic air data tube indicating the tube's internally accommodated component structures and positioning therein as revealed by a visual perception means which renders transparent the external portions of an air data tube.

Having once determined the general positioning and locations of the internal component structures, the air data tube is broached in those areas providing convenient access to the internally accommodated structures 2.08. Said broaching typically, though not limitedly, calls for a broaching of the air data tube strut component and probe component as well as external pressure fittings and electrical connectors. Once these components have been broached and access to internally accommodated components has been facilitated, the next process step in the invention is to remove all the internally accommodated air data tube components 2.11 which typically include, but are not limited to, at least one static tube component(s), at least one hermetic seal(s), a heating element component, probe component and pitot pressure line component 2.11. The heating element of the internally housed portion of the air data tube is typically attached along and throughout the internal surface areas of probe and strut air data tube components via brazing, welding or other similar means commonly known by those skilled in the art. The invention next calls for the refurbishment of the tube's internal surface areas 2.14. The air data tube components removed from the internal portion of the air data tube are next inspected 2.17 to determine those components requiring replacement and/or refurbishment. The tube is then subsequently reassembled utilizing replacement components 2.20. Without limitation, aircraft connection structures typically include pitot pressure fittings, heating element connecting fixtures, static port line(s), and static port line pressure fittings. Broached portions of the air data tube are next reattached and resealed. In certain circumstances it may be determined that the strut portion of the air data tube requires replacement. In most instances the external surface or surfaces of the air data tube must then be restored to an air worthy condition 2.28. Said restoring typically includes but is not limited to a smoothing out of all reconnected surfaces and an application of an external coating to further seal the exterior surface of the air data tube to further reduce its exposure to corrosive elements. Having discussed the methodology steps required to effectuate the restoration of a permanently sealed air data tube, FIG. 3A provides an illustration of an air data tube example subjected to X-ray analysis to determine internal component structures and placement. Turning now to FIG. 3A.

FIG. 3A illustrates an air data tube 3.05 when subjected to X-ray analysis 3.06 whereupon internal structural components are revealed. As seen in FIG. 3A, pitot pressure line component 3.08 opens to a pitot pressure opening 3.07 located on the leading edge of the probe component 3.17. Element 3.24 in FIG. 3A illustrates the positioning of a hermetic seal 3.24 within the interior portion of said probe component 3.17. Also positioned within the internal portion of the probe component 3.17 is an electrical heating element 3.11 which is generally affixed via brazing, welding, soldering, or other similarly intended attachment means known and practiced by those skilled in the art to the internal surface of said probe component 3.17. The heating element 3.11 also traverses the strut portion of the air data tube 3.14 and is generally affixed in a similar manner to the internal portion of said strut component 3.14 to thwart icing on the leading edge thereof. FIG. 3A further identifies a strut panel 3.26 of the air data tube strut which has been previously brazed, welded or sealed to form a permanently sealed air data tube. Said section represented as element 3.26 with a strut panel joint or demarcation indicated as 3.19. In most instances, a demarcation line similar to that found in 3.19 can be located using the above noted X-ray detection means on the air data tube's strut 3.14 that shows the original joint used in the manufacturing of the air data tube. However, it should be noted that the invention teaches towards accommodation of any alternative broaching determination means whereby manipulative access to the components accommodated within the internal section of the air data tube may be facilitated.

Figure 3B:
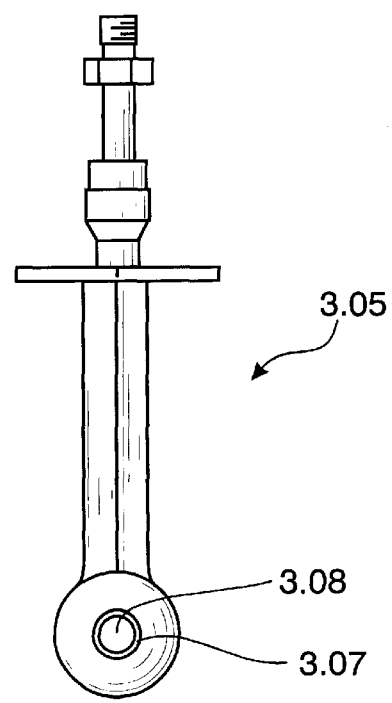
FIG. 3B is a front view illustration of an air data tube.

FIG. 3B illustrates a front view of an air data tube 3.05 providing further clarity with respect to the positioning and shape of the air data tube's pressure opening 3.07 which allows air to enter the air data tube into a pitot tube pressure line 3.08.

Figure 3C:
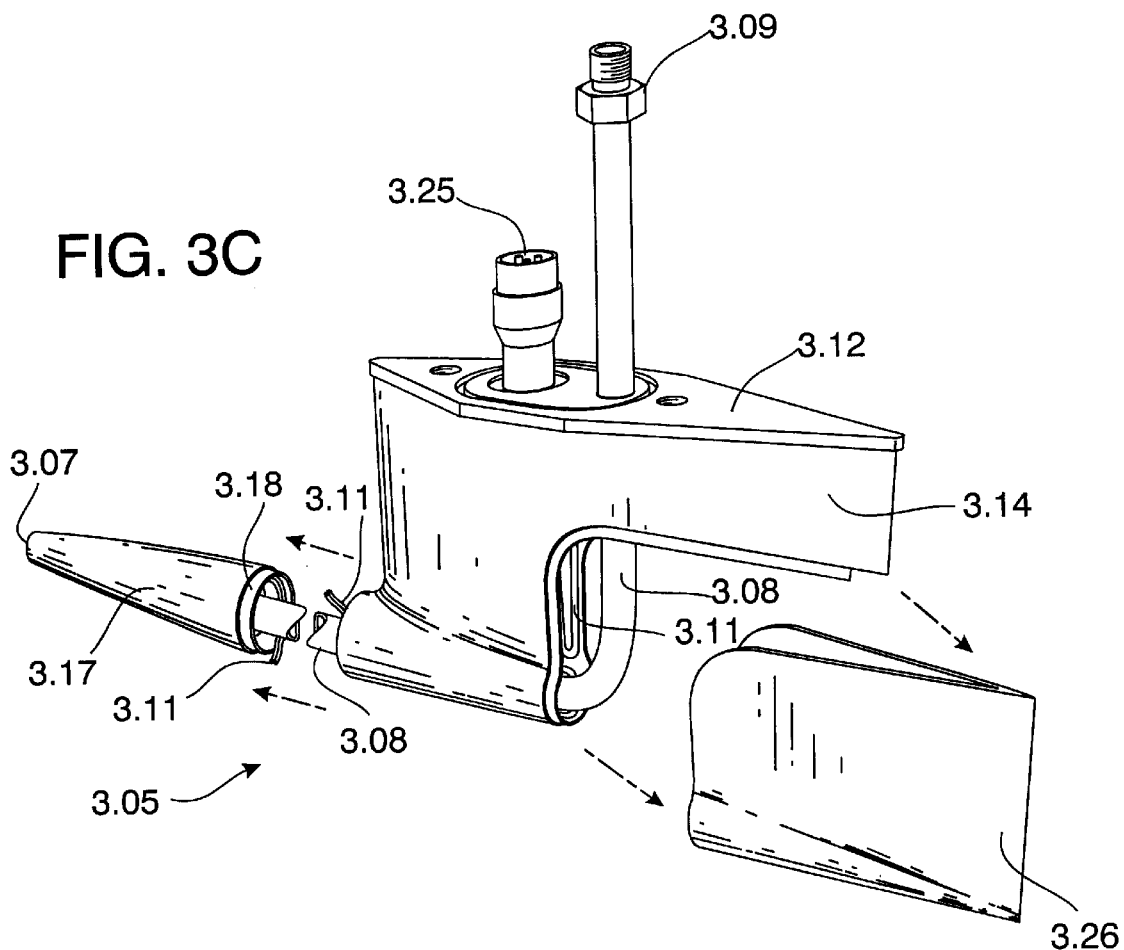
FIG. 3C is an exploded illustration of an air data tube further detailing its internal components.

FIG. 3C illustrates an exploded view illustration of an air data tube 3.05 further detailing its internal components having once broached the tube strut 3.14 and probe 3.17 components. A heating element electrical connector 3.25 is illustrated and is removed, with such removal evidenced and illustrated in FIG. 4. As can be seen in FIG. 3C, the probe section 3.17 has been removed or otherwise opened at location 3.18 to provide access to, and removal of, the heater element component 3.11 and pitot pressure line component 3.08 contained therein. FIG. 3C further illustrates the removal of strut panel 3.26 to provide access to the internally accommodated air data tube components and further detail with respect to a base mounting plate 3.12 used to affix said air data tube 3.05 to an aircraft.

Figure 4:
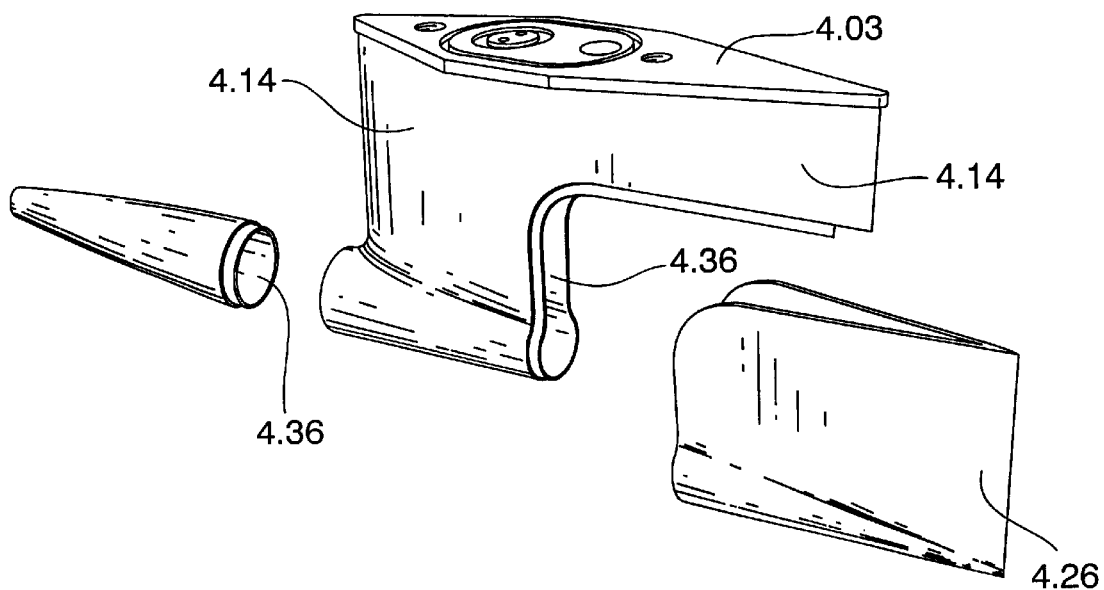
FIG. 4 is an exploded illustration of the instant invention having once removed the internal components of the air data tube and cleansed its internal surface areas.

FIG. 4 illustrates the air data tube having had its internal and external components removed and its internal surface area 4.36 refurbished to allow for insertion, positioning and re-attachment of heating element and other required internal components.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A method to repair a permanently sealed, air data tube comprising:
   (a) identifying at least one area of a strut component and at least one area of a probe component of said air data tube wherein said components may be broached to provide access to internal components accommodated generally within an interior portion of said tube;
   (b) broaching said strut component in an area generally consistent with those portions identified as providing access to said internal components;
   (c) removing at least one of said internally accommodated air data tube component;
   (d) inspecting exterior surfaces and said internally accommodated components of said air data tube;
   (e) determining at least one air data tube component requiring replacement wherein said determination is made by choosing from a group of said tube's inspected component, said group comprising a strut component, at least one heating element component, a probe component and at least one electrical connector;
   (f) re-assembling said air data tube with said determined replacement components; and
   (g) re-sealing said broached air data tube strut component.

2. The method of claim 1 wherein at least one area of a strut component or at least one area of a probe component of said air data tube may be broached to provide access to internal components accommodated generally within the interior portion of said tube.

3. The method of claim 1 where said group of components requiring replacement further includes at least one static line component and at least one static line fitting component.

4. The method of claim 1 where said group of components requiring replacement further includes at least one hermetic seal.

5. The method of claim 1 where said group of components requiring replacement further includes at least one pitot pressure line and at least one pitot pressure line fitting connector.

6. The method of claim 1 further comprising restoring the external surface of said re-sealed air data tube to an airworthy condition.

7. The method of claim 1 where said identification of said broachable areas is facilitated via X-ray of said air data tube.

8. The method of claim 1 where said identification of at least one area to broach said strut component is facilitated via X-ray of said air data tube strut component.

9. The method of claim 1 where said identification of said broachable areas is facilitated via a computerized axial tomography scan of said air data tube.

10. The method of claim 1 where said identification of at least one area to broach said strut component is facilitated via a computerized axial tomography scan of said air data tube strut component.

11. The method of claim 1 where said identification of at least one area to broach said strut component is facilitated by destructive analysis of a similar pitot tube model.

12. The method of claim 1 where said identification of at least one area to broach said strut component is facilitated by application of an abrasive means by which a strut panel opening through which internal air data tube components had been first traversed and positioned becomes visually perceptible.

13. The method of claim 1 where said identification of at least one area to broach said strut component is facilitated via a derivative means which visually presents the location and positioning of said air data tubes internally accommodated components.

14. The method of claim 1 wherein said removing of internally accommodated air data tube components further comprises disconnecting said structures from their respective aircraft pitot pressure fittings, and electrical connections.

15. The method according to claim 1 or 14 further comprising the disconnecting of said structures from a static pressure fitting.

16. The method of claim 1 wherein said vacated internal sections are refurbished via tooling means which clean and render smooth internal air data tube surfaces to which a heating element had been attached.

17. The method of claim 1 wherein said vacated internal sections are refurbished via chemical means which clean and render smooth internal air data tube surfaces to which a heating element had been attached.

18. The method of claim 1 wherein said vacated internal sections are refurbished via heat treatment means which clean and render smooth internal air data tube surfaces to which a heating element had been attached.

19. The method of claim 1 wherein the said determined area to broach said air data tube strut is a strut panel opening through which internal air data tube components had been first traversed and positioned.

20. The method of claim 1 wherein said positioning and re-assembling of said determined components further comprises:
(a) inserting, positioning and attaching an electrical heating element within the internal portions of said air data tube; and
(b) attaching said inserted and positioned heating element to an appropriate electrical connector.

21. The method of claim 1 wherein said positioning and re-assembling of said determined components further comprises:
(a) inserting, positioning and attaching an electrical heating element within the internal portions of said air data tube;
(b) attaching said inserted and positioned heating element to an appropriate electrical connector;
(c) inserting and positioning a pitot pressure line within the internal portions of said air data tube; and
(d) attaching said inserted and positioned pitot pressure line to an appropriate air data tube pressure fitting.

22. The method of claim 1 wherein said positioning and re-assembling of said determined components further comprises:
(a) inserting, positioning and attaching an electrical heating element within the internal portions of said air data tube;
(b) attaching said inserted and positioned heating element to an appropriate electrical connector;
(c) inserting and positioning a pitot pressure line within the internal portions of said air data tube;
(d) attaching said inserted and positioned pitot pressure line to an appropriate air data tube pressure fitting; and
(e) attaching said pitot pressure line to at least one hermetic seal.

23. The method of claim 1 wherein said positioning and re-assembling of said determined components further comprises:
(a) inserting, positioning and attaching an electrical heating element within the internal portions of said air data tube;
(b) attaching said inserted and positioned heating element to an appropriate electrical connector;
(c) inserting and positioning a pitot pressure line within the internal portions of said air data tube;
(d) attaching said inserted and positioned pitot pressure line to an appropriate air data tube pressure fitting;
(e) inserting and positioning at least one static port tube within the internal portions of said air data tube;
(f) attaching said at least one inserted and positioned static port tube to static tube pressure fitting(s); and
(g) attaching said static pressure tube to at least one hermetic seal.

24. The method of claim 1 wherein said positioning and re-assembling of said determined components further comprises:
(a) inserting, positioning and attaching an electrical heating element within the internal portions of said air data tube;
(b) attaching said inserted, positioned and attached said heating element to an appropriate electrical connector;
(c) inserting and positioning a pitot pressure line within the internal portions of said air data tube;
(d) attaching said inserted and positioned pitot pressure line to an appropriate pitot pressure line fitting;

(e) inserting and positioning at least one static port tube within the internal portions of said air data tube;

(f) attaching at least one said inserted and positioned static port tube to a static port tube pressure fitting; and (g) attaching an air data tube base plate to appropriate aircraft connecting structures.

* * * * *